Dec. 20, 1960 W. S. OAKES 2,965,839
GRID CURRENT DETECTOR FOR AUTOMATIC TUBE TESTING
Filed Aug. 6, 1957

INVENTOR:
WILLIAM S. OAKES,
BY Charles W. Helzer
HIS ATTORNEY.

United States Patent Office 2,965,839
Patented Dec. 20, 1960

2,965,839

GRID CURRENT DETECTOR FOR AUTOMATIC TUBE TESTING

William S. Oakes, Pattersonville, N.Y., assignor to General Electric Company, a corporation of New York Filed Aug. 6, 1957, Ser. No. 676,631

11 Claims. (Cl. 324—25)

The present invention relates to a testing circuit for measuring a number of operating characteristics of electron tubes.

More particularly, the invention relates to a testing circuit for establishing the grid current, plate current, plate current cutoff, heater-cathode leakage current, and screen grid current characteristics of electron tubes, and which is adapted to be automatically switched into and out of electric circuit relationship with an electron tube under test seated in a socket that can be indexed automatically into and out of circuit relationship with the testing circuit.

One of the necessary steps in the manufacture of electron tubes is that of establishing the operating characteristics of the newly-manufactured tubes in order that they be properly labeled. In the past it has been necessary to test the characteristics of newly-manufactured electron tubes manually, or in manually-operated tube testing circuits wherein it was necessary to separately plug each tube to be tested into the manually-operated tube tester and then align the tube tester to provide an indication of each desired characteristic to be measured. Because of their manual nature, such methods for testing electron tubes curtailed production of the tubes, and it was necessary to provide some automatically operating testing circuit arrangement capable of high-speed testing of electron tubes.

It is therefore one object of the present invention to provide a new and improved testing circuit for testing characteristics of newly manufactured electron tubes at a relatively high rate of speed.

Another object of the invention is to provide a new and improved testing circuit capable of automatically testing the characteristics of electron tubes on a go or no-go basis, and for automatically actuating an alarm or reject mechanism in the event an electron tube under test does not possess a desired characteristic.

A still further object of the invention is to provide a direct current testing circuit capable for use in measuring a number of characteristics of an electron tube under test.

In practicing the invention, an electron tube testing circuit is provided which comprises a load resistor adapted to be connected to an element of an electron tube under test from which a substantially direct current electric signal can be derived that is representative of the characteristic of the electron tube desired to be measured. The load resistor is connected to a direct current to alternating current signal converter for converting the substantially direct current electric signal to an alternating current signal whose peak to peak amplitude is representative of the characteristic of the electron tube desired to be measured. The signal converter has its output connected to a peak level detecting trigger circuit operative to provide an output trigger signal upon an alternating current signal being supplied thereto which has a peak amplitude greater than a predetermined value. The output of the peak level detecting trigger circuit is supplied to a reject relay which provides an indication that the electron tube under test does not possess the desired characteristic.

Other objects, features and many of the attendant advantages of this invention will be appreciated more readily as the same becomes better understood by reference to the following detailed description, when considered in connection with the accompanying drawings, wherein like parts in each of the several figures are identified by the same reference character, and wherein.

Figure 3:
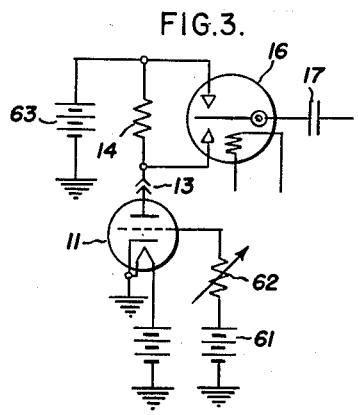
Figure 4:
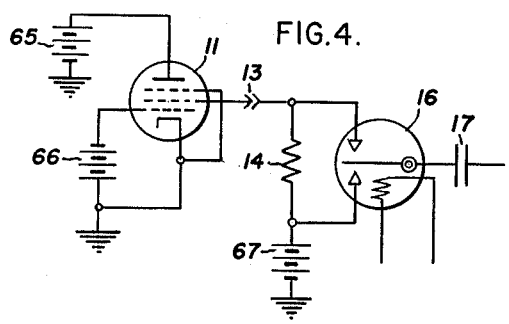

Fig. 3 is a schematic circuit diagram of a third embodiment of the invention, and illustrates the circuit connections required to use the testing circuit for measuring the plate current and plate current cutoff characteristics of an electron tube; and Fig. 4 is a schematic circuit diagram of a fourth embodiment of the invention, and illustrates the circuit connections required to measure the screen grid characteristics of an electron tube.

Figure 1:
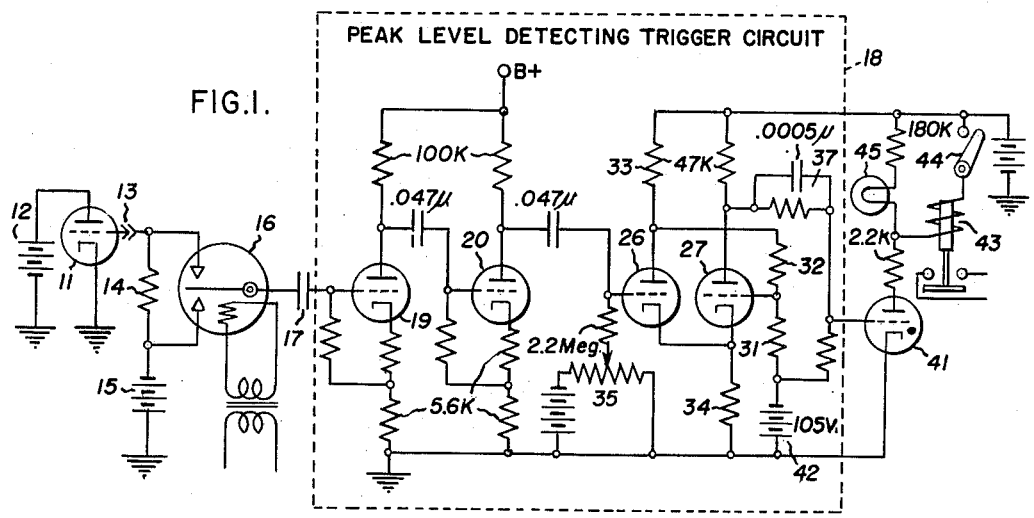
Fig. 1 is a schematic circuit diagram of a new and improved testing circuit constructed in accordance with the invention, and illustrates an embodiment of the invention designed to automatically measure the grid current of a newly manufactured electron tube.

In the embodiment of the invention shown in Fig. 1, an electron tube 11 is disclosed whose characteristics are to be measured. The anode electrode of the electron tube 11 is connected to a source of constant plate bias voltage which may comprise a battery 12, and the cathode electrode is connected directly to ground. It is preferred that the testing circuit be used in conjunction with an automatic tube tester where the electron tube 11 is mounted in one of a plurality of suitable electron tube receiving sockets supported on a rotating turntable adapted to index each one of the sockets sequentially into testing position with respect to the circuit shown. For this purpose, the control grid of electron tube 11 under test is connected through a pair of coacting sliding switch contacts 13 to the remainder of the novel testing circuit. For this purpose the sliding switch 13 may comprise a first moveable contact in the form of a slip ring mounted on the turntable at the point adjacent the socket in which tube 11 is supported, and adapted to cooperate with a wiper arm connected to the remainder of the testing circuit. The control grid of electron tube 11 under test is connected through sliding switch 13 directly to a load resistor 14, and to a source of direct current biasing voltage which may comprise a battery 15. By reason of this construction, any grid current drawn by the control grid electrode of the electron tube 11 under test, develops a direct current electric signal across load resistor 14 which is representative of the grid current in the tube 11. The amplitude of this grid current is in turn representative of the amount of gas present in the tube 11 under test, and if it exceeds some predetermined acceptable value, it provides a good indication that the tube will fail to operate satisfactorily in service. Accordingly, it is desirable to derive some indication of the magnitude of the grid current, and for this purpose the remainder of the testing circuit described hereinafter is provided.

The load resistor 14 is connected across a direct current to alternating current converter 16 of the conventional vibrating reed type which has a vibrating armature that is vibrated or oscillated back and forth between the two fixed contacts to which load resistor 14 is connected. Converter 16 functions to convert the direct current electric signal appearing across load resistor 14 to an alternating current electric signal whose peak to peak amplitude is representative of the amplitude of the direct current signal appearing across resistor 14, and hence of the grid current. This alternating current electric signal is coupled through a coupling capacitor 17 to the input of a peak level detecting trigger circuit indicated by the dotted lines 18. The peak level detecting trigger circuit preferably includes a two-stage resistance-capacitance coupled amplifier formed by a first electron tube 19 having the plate electrode thereof coupled to the control grid electrode of a second electron tube 20 by a coupling capacitor 21, together with conventional plate load resistors, and cathode biasing resistors for providing suitable biasing potentials to the tube. Because the two-stage amplifier 19 and 20 operates in a conventional fashion to amplify the alternating current electric signals supplied thereto by converter 16, it will not be described in greater detail. For a more detailed description of the two-stage resistance-capacitance coupled amplifier, reference is made to any of the standard text books on electronic circuitry, for example the text book entitled "Applied Electronics," published by the Technology Press, Massachusetts Institute of Technology, Cambridge, Massachusetts, 1943.

The peak level detecting trigger circuit 18 further includes a cathode coupled one-shot multivibrator and that is comprised by electron tubes 26 and 27, and which has its input coupled to the output of the two-stage amplifier 19 and 20. For a more detailed description of the construction and operation of cathode coupled one-shot multivibrators 26 and 27, reference is made to any of the standard text books for example the text book entitled "Principles of Radar," produced by the MIT Radar School Staff, 3rd edition, by Reintjes and Coate, published by the McGraw-Hill Book Company, 1952. Briefly, however the one-shot multivibrator operates in the following manner. A bias voltage is supplied to the control grid of the electron tube 27 by a voltage dividing net-work comprising resistors 31, 32 and plate resistor 33 of electron tube 26. This bias voltage is adjusted so that tube 27 is normally conductive. Conduction of electron tube 27 develops a positive bias across a common cathode load resistor 34, which in conjunction with a negative bias voltage supplied to the control grid of electron tube 26 from a voltage divider 35, serves to maintain the electron tube 26 in the cutoff condition. The output signal from two-stage amplifier 19 and 20 is coupled to the control grid of electron tube 26, and when its peak to peak value exceeds the value of the cutoff bias voltage supplied to tube 26 by the voltage divider 35, and cathode bias resistor 34, which is set to correspond to the upper limit of the allowable control grid voltage of the electron tube 11 under test, electron tube 26 is rendered conductive. Conduction of electron tube 26 causes a negative going signal to be applied to the control grid of electron tube 27 which renders that tube non-conductive, resulting in the development of a positive going signal pulse in its plate circuit.

The positive going signal pulse developed in the plate circuit of electron tube 27 is preferably coupled through a resistance-capacitance coupling network 37 to the control grid of a grid controlled gas discharge device comprising a thyratron tube 41.

Thyratron tube 41 also has its control grid coupled through a voltage dropping resistor to a source of negative biasing potential comprising a battery 42. The bias voltage supplied from battery 42 to thyratron tube 41 maintains this tube in a normally non-conductive condition. Upon the application of a positive going signal pulse from the output of the peak level detecting trigger circuit 18, however, the negative bias supplied to thyratron tube 41 is overcome, and the tube is rendered conductive. Thyratron tube 41 has a reject relay 43 connected in its plate circuit together with a reset switch 44, and, if desired, a neon light indicator 45 may be connected in parallel with the relay 43. The reset switch 44 is normally closed, so that upon conduction through the thyratron tube 41, the normally open switch contacts of relay 43, are closed, thereby actuating a reject indicator, or mechanism for ejecting the tube 11 under test from the socket in which it is seated.

Having described the construction of the new and improved testing circuit shown in Fig. 1, briefly, it operates in the following manner. Any grid current flowing in the electron tube 11 under test, causes a direct current signal to flow in load resistor 14 which is proportional to the magnitude of the grid current. This direct current signal is converted by converter 16 to an alternating current signal whose peak to peak amplitude is proportional to the magnitude of the grid current. The peak amplitude of this alternating current signal is then compared to the value of the negative control grid bias voltage supplied to electron tube 26 by voltage divider 35, and if it is sufficiently great to overcome the negative bias supplied to electron tube 26, the tube is rendered conductive. This results in cutting off electron tube 27, and supplying a positive going trigger pulse to thyratron 41. Accordingly, it can be appreciated that by proper adjustment of the negative grid bias voltage supplied from the voltage divider 35 to the control grid of electron tube 26 in trigger circuit 18, the trigger circuit can be set to accommodate any desired value of grid leakage current through the resistor 14, and that the setting thus proportioned causes the trigger circuit to accept or reject electron tubes 11 under test on a go-no-go basis. It can be further appreciated that the testing circuit is entirely automatic in operation, and is capable of performing a desired electron tube test at a relatively rapid rate.

Figure 2:
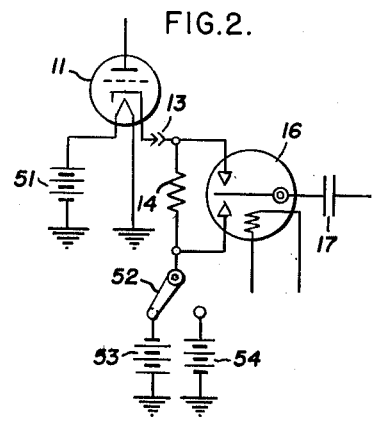
Fig. 2 is a schematic circuit diagram of a second embodiment of the new and improved testing circuit capable of rapidly measuring the heater-cathode leakage current of an electron tube.

The embodiment of the invention shown in Fig. 2 of the drawings illustrates a new and improved testing circuit modified to measure the heater-cathode leakage current characteristics of an electron tube 11 under test. For the purposes of the heater-cathode current leakage test, the heater filament of the electron tube 11 has one of its terminals grounded, and the remaining terminal connected to a filament supply voltage that may comprise a battery 51. In this test, the control grid electrode and the plate electrode of the tube 11 need not be energized; however cathode electrode of electron tube 11 under test is connected through a sliding switch contact 13, and a load resistor 14 to a selector switch 52 for connecting the cathode to either a negative polarity source of cathode biasing voltage comprising battery 53, or to a positive polarity source of cathode biasing voltage comprising a battery 54. In this testing arrangement, the load resistor 14 is again connected across a direct current to alternating current converter 16, and the output of the converter is coupled through a coupling capacitor 17 to a peak level detecting trigger circuit (not shown) such as that described with relation to Fig. 1. In view of the fact that the remainder of the trigger circuit portion of the testing arrangement is identical to that illustrated in Fig. 1 of the drawings, it is not believed necessary to show that portion of the circuit again in detail.

In operating the test arrangement as shown in Fig. 2 of the drawings, a bias voltage of one polarity is first applied to the cathode of the electron tube 11 under test, by one of the cathode bias batteries 53 or 54, and then the selector switch 52 is reversed to apply a bias voltage of an opposite polarity to the cathode. In this manner, the relative operating conditions of the cathode electrode and the heater filament of the electron tube are in effect synthetically reproduced, and any current flowing through the load resistor 14 as a result, will be due to heater-cathode leakage current flowing in the electron tube 11 under test. Any such heater-cathode leakage current will develop a direct current signal across the load resistor 14, which is converted to an alternating current signal by converter 16, and applied to a peak level detecting trigger circuit 18 (not shown). If the heater-cathode leakage current is of sufficient amplitude, the trigger current 18 will actuate a reject relay, and cause the electron tube 11 under test to be rejected.

The embodiment of the invention disclosed in Fig. 3 of the drawings is designed to provide a measurement of the plate current, and plate current cutoff characteristics of an electron tube 11 under test. For the purpose of this test, the electron tube 11 has a direct current bias voltage supplied to the control grid thereof from a battery 61 through a voltage dropping variable resistor 62, and has the cathode thereof connected directly to ground. Because this is a dynamic test, the normal heater filament voltage is supplied to the heater filament of the tube 11 under test. The plate electrode of electron tube 11 is connected through a sliding switch 13 similar to that described with relation to the testing circuit shown in Fig. 1, and through a positive plate potential comprising a battery 63. As is conventional in all testing circuits described herein, a direct current to alternating current signal converter 16 is connected across the load resistor 14, and has its output coupled through a coupling capacitor 17 to a peak level detecting trigger circuit (not shown) such as that described with relation to Fig. 1 of the drawings. In this particular embodiment of the invention, it is essential that the value of the load resistor 14 be sufficiently low so as not to introduce an erroneous reading into the testing circuit. For most electron tubes, a resistor having a value of approximately one hundred ohms is adequate.

In the case where the test arrangement shown in Fig. 3 of the drawings is to be used as a plate current detector, the value of the bias supplied to the control grid of electron tube 11 by battery 61 through variable resistor 62 is adjusted to be in the neighborhood of the normal operating bias designed for the tube. With the bias voltages thus adjusted, the current flowing through load resistor 14 provides an indication of the plate current of the tube under test. In the case where the test arrangement shown in Fig. 3 is to be used as a plate current cutoff detector, the value of the bias supplied to the control grid of electron tube 11 by battery 61 through variable resistor 62 is adjusted to be in the neighborhood of the cutoff value designed for the tube. In this case the signal obtained across load resistor 14 provides an indication of the plate current cutoff characteristic of the electron tube 11 under test. In either case, the varying direct current signal flowing through load resistor 14 is converted to an alternating current signal having a peak to peak amplitude representative of either the plate current characteristic of electron tube 11, or the plate current cutoff characteristic of the tube. This alternating current signal is then supplied to a peak level detecting trigger circuit such as that illustrated in Fig. 1 of the drawings, and if the value of the plate current, or plate current cutoff exceed some predetermined value, the reject relay is actuated to reject the electron tube 11 under test.

In the embodiment of the invention shown in Fig. 4 of the drawings, a testing circuit is disclosed for measuring the screen grid current characteristic of an electron tube 11 under test. For the purpose of this test, the plate electrode of the electron tube 11 has a positive bias voltage supplied thereto from a battery 65, and the control grid electrode has a battery 66 connected thereto for the purpose of supplying an operating bias voltage to the control grid. The cathode electrode of the electron tube 11 under test is connected directly to ground and to the suppressor grid electrode of the tube. The screen grid electrode of electron tube 11 is connected through a sliding switch 13 and a load resistor 14 to a source of positive biasing potential comprising a battery 67. The load resistor 14 has a direct current to alternating converter 16 connected across its terminals, and the converter 16 in turn has its output coupled through a coupling capacitor 17 to a peak level detecting trigger circuit (not shown) such as that described in relation to Fig. 1 of the drawings.

In operation, the testing circuit arrangement illustrated in Fig. 4 of the drawings has the operating bias potentials supplied by each of the batteries adjusted to obtain conduction through the electron tube 11 equivalent to that obtained under normal operating conditions. Under these conditions, any current flowing through the load resistor 14 is indicative of the screen grid current being drawn by the tube. Any such current is converted by converter 16 to an alternating current signal having a peak to peak amplitude representative of the value of the screen grid current, and this alternating current signal is coupled through coupling capacitor 17 to a peak level detecting trigger circuit (not shown). If the magnitude of the screen grid current is sufficiently great, it will render the trigger circuit operative to actuate a reject relay connected in the output of the trigger circuit.

From the foregoing description, it can be appreciated that the invention provides a new and improved testing circuit arrangement for use in testing the various operating characteristics of electron tubes. The new and improved testing circuit is designed to provide fast and reliable testing of the characteristics of newly manufactured electron tubes, and hence has been designed for ready incorporation into an automatic tube testing apparatus. In constructing the circuits illustrated in the several drawings, the values of the circuit parameters are generally those illustrated in connection with the circuit arrangements shown in the drawing; however, it can be appreciated that many of these parameters can be varied in value without substantially affecting the operation of the testing circuit. Additionally, it is believed obvious that other modifications and variations of the specific embodiments of the new and improved testing circuit illustrated, are possible in the light of the above teachings. It is therefore to be understood that changes may be made in the particular embodiments of the invention disclosed which are within the full intended scope of the invention as defined in the appended claims.

What I claim as new and desire to secure by Letters Patent of the United States is:

1. In an electron tube testing circuit, the combination comprising a load resistor adapted to be connected directly in series with an element of the electron tube under test from which a substantially direct current electric signal can be derived whose magnitude is representative of the characteristic of the electron tube desired to be measured, a direct current to alternating current signal converter connected across said load resistor for converting the substantially direct current electric signal to an alternating current signal whose peak to peak amplitude is representative of the characteristic of the electron tube desired to be measured, a peak level detecting trigger circuit, said trigger circuit including triggering means comprising a thyratron and precision bias generating means for said triggering means comprising a multivibrator means for connecting the output of said converter to the normally-off stage of said multivibrator, said trigger circuit being operative to provide an output trigger signal upon an alternating current signal being supplied thereto having a peak amplitude greater than a predetermined value, and a reject relay operatively coupled to the output of said trigger circuit.

2. The combination set forth in claim 1 wherein the electron tube characteristic desired to be measured is the negative grid current with the electron tube under test having a constant value direct current bias voltage of positive polarity supplied to the anode electrode, and a constant value direct current bias voltage of negative polarity supplied to the grid electrode, and the load resistor is connected in circuit relationship with the grid electrode of the electron tube under test.

3. The combination set forth in claim 1 wherein the electron tube characteristic desired to be measured is the heater-cathode leakage current with the electron tube under test having a grounded heater filament circuit and a reversible polarity cathode electrode bias voltage supplied to the cathode electrode thereof, and the load resistor is connected in circuit relationship with the cathode electrode of the electron tube under test.

4. The combination set forth in claim 1 wherein the electron tube characteristic desired to be measured is the plate current and plate current cutoff characteristic with the electron tube under test having desired value direct bias voltages supplied to the cathode electrode, control grid electrode, and plate electrode thereof, and the load resistor is connected in circuit relationship with the plate electrode of the electron tube under test.

5. The combination set forth in claim 1 wherein the electron tube characteristic desired to be measured is the screen grid current with the electron tube under test having constant value direct current bias voltages supplied to the cathode electrode, control grid electrode, screen grid electrode and plate electrode thereof, and the load resistor is connected in circuit relationship with the screen grid electrode of the electron tube under test.

6. In an electron tube testing circuit adapted to be switched into electric circuit relationship with an electron tube under test, the combination comprising a load resistor to be connected in direct series circuit relationship with an element of the electron tube under test from which a substantially direct current electric signal can be derived whose magnitude representative of the characteristic of the electron tube desired to be measured, a direct current to alternating current signal converter comprising a vibrating reed chopper connected across said load resistor for converting the substantially direct current electric signal to an alternating current signal whose peak to peak amplitude is representative of the characteristic of the electron tube desired to be measured, a peak level detecting trigger circuit operatively coupled to the output of said converter, said trigger circuit comprising an amplifier one-shot multivibrator, means for varying the bias of the normally-off stage of said multivibrator, means for connecting the output of said amplifier to the grid of the normally-off stage of said multivibrator, whereby an output trigger signal, generated by said multivibrator upon an alternating current signal being supplied thereto by said amplifier having a peak amplitude greater than a predetermined value, a grid controlled gas discharge device having the control grid thereof coupled to the output of said one-shot multivibrator, and a reject relay connected in the output circuit of said gas discharge device.

7. The combination set forth in claim 6 wherein the electron tube characteristic desired to be measured is the negative grid current with the electron tube under test having a constant value direct current bias voltage of positive polarity supplied to the anode electrode, and a constant value direct current bias voltage of negative polarity supplied to the grid electrode, and the load resistor is connected in circuit relationship with the grid electrode of the electron tube under test.

8. The combination set forth in claim 6 wherein the electron tube characteristic desired to be measured is the heater-cathode leakage current with the electron tube under test having a grounded heater filament circuit and a reversible polarity cathode electrode bias voltage supplied to the cathode electrode thereof, and the load resistor is connected in circuit relationship with the cathode electrode of the electron tube under test.

9. The combination set forth in claim 6 wherein the electron tube characteristic desired to be measured is the plate current and plate current cutoff characteristics with the electron tube under test having desired value direct current bias voltage supplied to the cathode electrode, control grid electrode, and plate electrode thereof, and the load resistor is connected in circuit relationship with the plate electrode of the electron tube under test.

10. The combination set forth in claim 6 wherein the electron tube characteristic desired to be measured is the screen grid current with the electron tube under test having constant value direct current bias voltages supplied to the cathode electrode, control grid electrode, screen grid electrode and plate electrode thereof, and the load resistor is connected in circuit relationship with the screen grid electrode of the electron tube under test.

11. In an electron tube testing circuit, the combination of a load resistor adapted to be connected in series circuit relation with an element of an electron tube under test, a signal converter for generating an alternating current signal whose peak-to-peak amplitude is proportional to the magnitude of the current in said load resistor, a peak-level detecting trigger circuit including an amplifier and a one shot multivibrator having a normally-off stage fed by the output of the amplifier, means for connecting the ouput of said signal converter to the input of said amplifier, precision bias generating means including means for varying the control-grid bias of the normally-off stage of said multivibrator, and a control circuit including a thyratron having a control grid connected to the output of said multivibrator.

References Cited in the file of this patent
UNITED STATES PATENTS

| | | |
|---|---|---|
| 2,278,697 | Gould | Apr. 7, 1942 |
| 2,632,040 | Rabinow | Mar. 17, 1953 |
| 2,749,510 | Rively | June 5, 1956 |
| 2,784,372 | Bramsen | Mar. 5, 1957 |
| 2,822,518 | Jordan | Feb. 4, 1958 |